US009307752B2

(12) United States Patent
Matsuda

(10) Patent No.: US 9,307,752 B2
(45) Date of Patent: Apr. 12, 2016

(54) FISHING SPINNING REEL

(71) Applicant: Globeride, Inc., Tokyo (JP)

(72) Inventor: Kazuyuki Matsuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/613,705

(22) Filed: Feb. 4, 2015

(65) Prior Publication Data

US 2015/0216155 A1 Aug. 6, 2015

(30) Foreign Application Priority Data

Feb. 6, 2014 (JP) ................................. 2014-021385

(51) Int. Cl.
*A01K 89/01* (2006.01)

(52) U.S. Cl.
CPC ......... *A01K 89/0193* (2015.05); *A01K 89/0108* (2013.01); *A01K 89/01085* (2015.05); *A01K 89/011223* (2015.05)

(58) Field of Classification Search
CPC .................. A01K 89/0108; A01K 89/01081; A01K 89/01082; A01K 89/01083; A01K 89/011221; A01K 89/011223
See application file for complete search history.

(56) References Cited

U.S. PATENT DOCUMENTS

| | | | |
|---|---|---|---|
| 4,692,826 A | 9/1987 | Raj et al. | |
| 5,152,539 A * | 10/1992 | Takii | F16C 33/765 277/347 |
| 5,238,254 A * | 8/1993 | Takii | F16C 33/765 277/347 |
| 5,572,078 A * | 11/1996 | Saichi | H02K 5/173 310/44 |
| 6,227,474 B1 * | 5/2001 | Okada | A01K 89/0108 242/150 R |
| 6,543,781 B1 * | 4/2003 | Rehm | F16C 33/765 277/410 |
| 6,558,042 B1 * | 5/2003 | Tompkins | F16C 33/765 277/410 |
| 8,844,856 B2 | 9/2014 | Ohara et al. | |
| 2010/0090413 A1 * | 4/2010 | Mahoney | F16C 33/765 277/410 |
| 2011/0248449 A1 * | 10/2011 | Li | F16J 15/43 277/302 |
| 2012/0048981 A1 * | 3/2012 | Ohara | A01K 89/0108 242/230 |
| 2014/0346265 A1 | 11/2014 | Ohara et al. | |
| 2015/0122930 A1 * | 5/2015 | Ohara | F16C 33/765 242/321 |

FOREIGN PATENT DOCUMENTS

| | | |
|---|---|---|
| JP | 2013-000097 | 1/2013 |
| JP | 2013-000110 | 1/2013 |

OTHER PUBLICATIONS

Extended European Search Report dated Jun. 10, 2015 for Appln. No. 15153806.3.

* cited by examiner

*Primary Examiner* — Emmanuel M Marcelo
(74) *Attorney, Agent, or Firm* — Pillsbury Winthrop Shaw Pittman, LLP

(57) ABSTRACT

According to one aspect of the disclosure, it is possible to provide a fishing spinning reel that can securely prevent penetration of seawater and foreign substances into a bearing, have a sufficient durability for use in harsh environments, a fine rotational performance, and easy handling and maintenance. In the fishing spinning reel of the disclosure, a magnetic fluid sealed bearing in which a magnetic fluid seal is provided integrally with a bearing, and a line roller is rotatably supported on a supporting shaft through the magnetic fluid sealed bearing. A magnetic fluid seal is provided on both sides of a bearing body of the bearing. Moreover, a magnetic fluid of the magnetic fluid seal includes an outer ring magnet fluid retained between an outer ring and a magnet, and an inner ring magnetic fluid retained between the inner ring and a retaining plate.

3 Claims, 4 Drawing Sheets

FISHING SPINNING REEL

CROSS-REFERENCE TO RELATED APPLICATIONS

This application is based on and claims the benefit of priority from Japanese Patent Application Serial No. 2014-021385 (filed on Feb. 6, 2014), the contents of which are hereby incorporated by reference in their entirety.

TECHNICAL FIELD

The present disclosure relates to a fishing spinning reel having a magnetic fluid sealed bearing in which a magnetic fluid seal is provided integrally with the bearing, more particularly, to a fishing spinning reel in which a line roller for guiding a fishing line to a spool is supported by the magnetic fluid sealed bearing.

BACKGROUND

There have been conventionally known fishing reels including a magnetic seal mechanism using a magnetic fluid applied to a bearing. For instance, Japanese Patent Application Publication No. 2013-97 (the "97 Publication") discloses a support structure of a line roller in which the line roller is rotatably supported on a supporting shaft through a bearing for guiding a fishing line to a spool. The '97 Publication also describes a magnetic seal mechanism in which a magnetic fluid is retained by using a magnetic circuit formed between an outer ring of the bearing and a magnet provided on a side of the bearing.

Japanese Patent Application Publication No. 2013-110 (the "110 Publication") discloses a fishing reel in which a drive shaft that is rotated by handle operation is rotatably supported by a magnetic fluid sealed bearing in which a magnetic fluid seal is provided integrally with the bearing.

However, in the sealed bearing structure of the '97 Publication, only one side of the bearing is magnetically sealed so that seawater could penetrate through a fitting portion between an inner ring of the bearing and the supporting shaft, a fitting portion between an outer ring of the bearing and the line roller, and a portion where a screw is clamped. The seawater in the bearing may degrade smoothness of the bearing and therefore the sealing structure of the '97 Publication is not sufficient for a support member of a fishing line guide used in a harsh environment.

Moreover, in the sealed bearing structure of the '97 Publication, the magnetic seal mechanism is arranged adjacent to the side of the bearing so that it can be troublesome to handle it and to perform maintenance. In addition, because only the one side of the bearing is magnetically sealed, both sides of the inner ring are pressed toward the shaft in order to enhance a waterproof property. Accordingly a shear force in the axial direction works on the inner and outer rings of the bearing, and an excessive force could work on the bearing, which slows rotation of the line roller.

Whereas in the sealed bearing structure of the '110 Publication, the drive shaft that is rotated by handle operation is rotatably supported by the magnetic fluid sealed bearing in which the magnetic fluid seal is provided integrally with the bearing so that it can be easy to handle and to perform maintenance. However, this sealing is only for the bearing that supports the drive shaft rotated by the handle operations and is not for a bearing of a rapidly-rotating line roller that imparts a strong tension to a fishing line to guide the fishing line to the spool. Moreover, like the one disclosed in the '97 Publication, since only the one side of the bearing is magnetically sealed so there is the same drawback as the one described above with reference to the '97 Publication.

SUMMARY

The present disclosure addresses the above drawbacks. One object thereof is to provide a fishing spinning reel that can securely prevent penetration of seawater and foreign substances into the bearing, and have a sufficient durability for use in harsh environments, a fine rotational performance, and easy handling and maintenance.

According to one aspect of the disclosure, a fishing spinning reel includes a rotor rotated by rotational operation of a handle to wind a fishing line around a spool, a line roller through which the fishing line is guided to the spool, a magnetic fluid sealed bearing in which a magnetic fluid seal is provided integrally with a bearing. The line roller is rotatably supported on a supporting shaft through the magnetic fluid sealed bearing. The magnetic fluid sealed bearing includes a bearing body having an inner ring made of a magnetic material, an outer ring made of a magnetic material, and a rolling member placed between the inner ring and the outer ring so as to be rollable, and a magnetic fluid seal retained integrally with the bearing body and forming a magnetic circuit with the inner ring or the outer ring to seal an inside of the bearing body. The magnetic fluid seal includes a magnet forming the magnetic circuit with the inner ring or the outer ring, a retaining plate retaining the magnet, and a magnetic fluid retained between the inner ring or the outer ring and the retaining plate or the magnet.

According to the fishing spinning reel as described above, the line roller is rotatably supported on the supporting shaft through the magnetic fluid sealed bearing in which the magnetic fluid seal is provided integrally with the bearing. Therefore, it is possible to improve the easiness of handling and maintenance. (Especially for the rapidly-rotating line roller that imparts a strong tension to a fishing line to guide the fishing line to the spool, various foreign substances and solids of seawater and the like are adhered around the supporting portion of the line roller as actual fishing is repeatedly performed. So easiness of maintenance is very beneficial.) In addition, it is possible to securely seal the bearing of the line roller that rotates rapidly and imparts a strong tension to a fishing line to guide the fishing line to the spool. Moreover, because the magnetic fluid sealed bearing is unitized, it is not necessary to secure a space for sealing in addition to a space for placing the bearing. Accordingly, only small space is necessary to install the seal and the bearing. Further, there is no need of installing a magnetic sealing mechanism separately from the bearings, resulting in good built-in work efficiency and increased productivity (that is, reduced built-in work time and production costs).

It is preferable that the magnetic fluid seal be provided on both sides of the bearing body. Therefore, it would be very advantageous for the line roller 23 that is used in harsh environments, rotates rapidly and guides a fishing line to which seawater, foreign substances and the like are adhered to the spool 5. In other words, by providing the magnetic fluid seal on the both sides of the baring body, it is ensured to prevent seawater and the like from penetrating inside the bearing through a fitting portion between the inner ring of the bearing and the supporting shaft, a fitting portion between the outer ring of the bearing and the line roller, and a portion where the screw is clamped. Therefore it is possible to decrease the chance that the seawater enters into the bearing and degrades smoothness of the bearing. This advantageous effect can be enhanced by providing the magnetic fluid to both of the inner and outer rings. More specifically, it can be enhanced by providing an outer ring magnet fluid retained between the outer ring and the magnet, and an inner ring magnetic fluid retained between the inner ring and the retaining plate.

When the magnetic fluid seal is provided on the both sides of the bearing body, both sides of the inner ring does not have to be press-fitted in the axial direction in order to enhance the waterproof property, which has been described above with reference to the '97 Publication (the bearing body can be supported on the supporting shaft without pressing the bearing body in the axial direction of the supporting shaft (for example, with a prescribed play in the axial direction)). Therefore, a shear force in the axial direction does not work on the inner and outer rings of the bearing. Consequently, it is possible to smooth the rotation of the bearing and accordingly the rotation of the line roller, resulting in enhancement of the rotation performance of the line roller.

Moreover, in the above-described configuration, it is preferable that a clearance be provided between the magnetic fluid of the magnetic fluid seal and a portion of the bail support member facing the magnetic fluid in order to prevent the magnetic fluid from adhering to the support member. The clearance may be formed in any way such as by providing a space (a groove) in the support member for allowing the magnetic fluid to flow thereto. By providing the clearance, when the magnetic fluid swells outward due to capillary action, centrifugal force generated by the rapid rotation of the rotor, pressure change caused by thermal expansion or the like, it is possible to prevent the swelling magnetic fluid from being adhered to parts therearound, in particular, the support member. Accordingly, it is possible to prevent the magnetic fluid in the bearing from being lost and the fine sealing property can be maintained.

According to one aspect of the disclosure, it is possible to provide a fishing spinning reel that can securely prevent penetration of seawater and foreign substances into a bearing, and have a sufficient durability for use in harsh environments, a fine rotational performance, and easy handling and maintenance.

DESCRIPTION OF THE PREFERRED EMBODIMENTS

An Embodiment of a fishing spinning reel according to an aspect of the disclosure will be hereinafter described with reference to the accompanying drawings.

Figure 1:
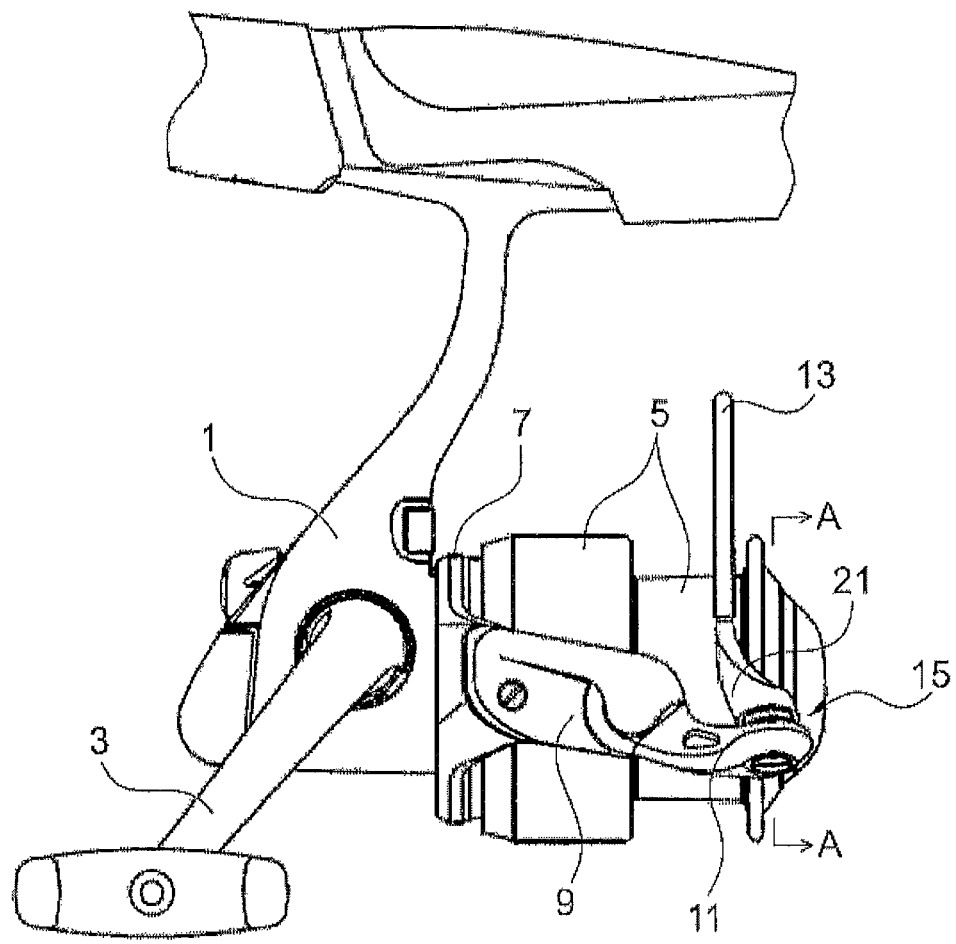
FIG. 1 is a side view of a whole fishing spinning reel according to an embodiment of the present disclosure.
Figure 2:
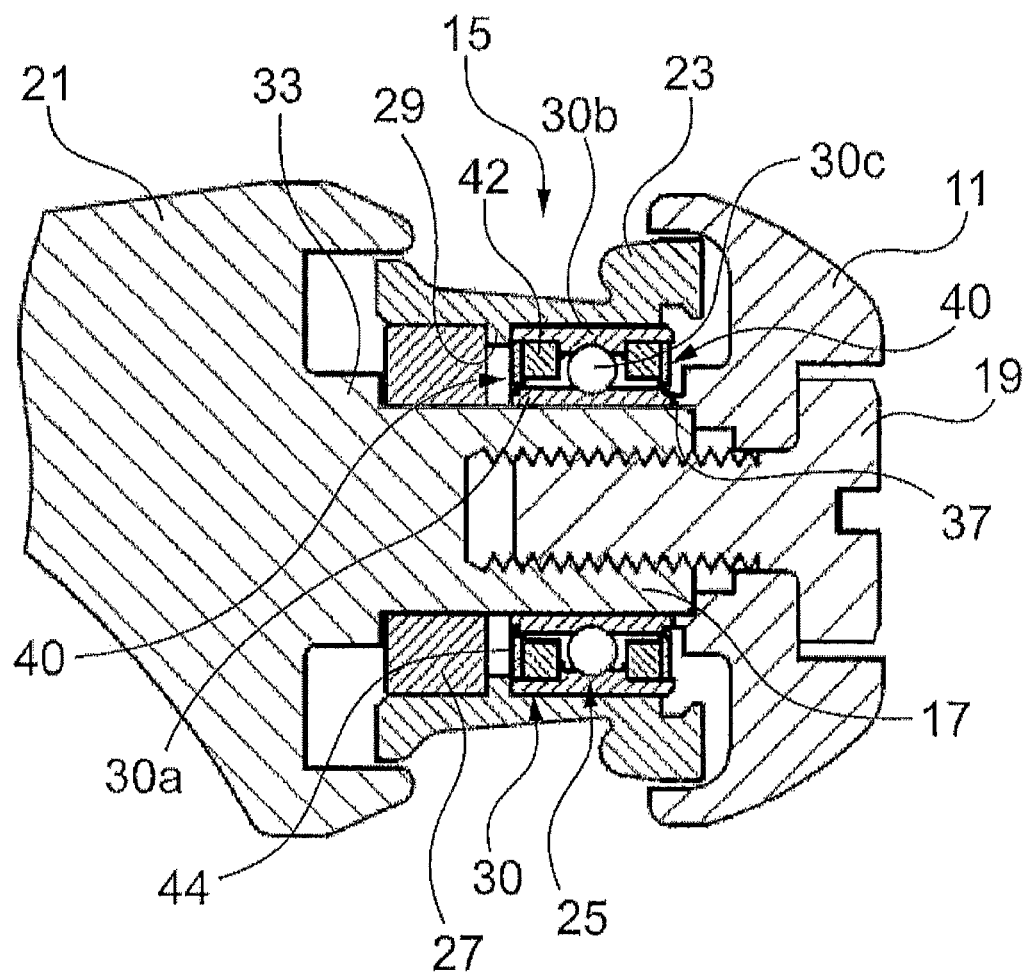
FIG. 2 is a sectional view along the A-A line in FIG. 1.
Figure 3:
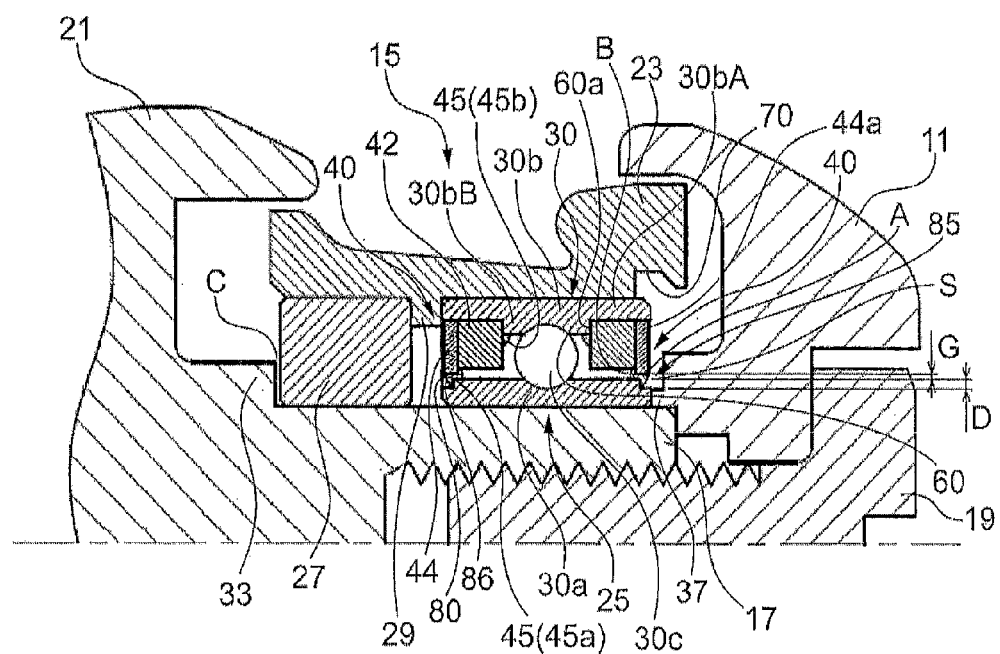
FIG. 3 is an enlarged sectional view including an essential portion shown in FIG. 2.

FIGS. 1 to 3 illustrate a fishing spinning reel according to an embodiment of the disclosure. Referring to FIG. 1, the fishing spinning reel according to the embodiment includes a reel body 1. A drive gear (not shown) may be provided in the reel body 1. The drive gear is rotated by a rotational operation of a handle 3 and meshes with a pinion. A spool shaft (not shown) may be inserted through the pinion in the axial direction, and a spool 5 around which a fishing line is wound may be rotatably attached to a tip of the spool shaft. The spool shaft (the spool 5) may be configured to move back and forth by rotation of the drive gear through an oscillating mechanism (not shown) that engages with the drive gear.

A rotor 7 may be disposed on a tip of the pinion. The rotor 7 may rotate in conjunction with the pinion and a pair of support arms 9 may be provided on the rotor 7. A bail 13 may be provided on the support arms 9 respectively. The bail 13 may be rotatably supported through a support member 11 such that it can be switched between a fishing-line releasing state and a fishing-line winding state, Between one of the supporting members 11 and an end of the corresponding bail 13, a fishing line guide 15 for guiding a fishing line to the spool 5 may be disposed, which will be hereunder described.

When the handle 3 is rotationally operated in this a configuration, the rotational movement of the handle is transmitted to the pinion through the drive gear, and the rotor 7 is rotated through the pinion. At the same time, the rotational movement is transmitted to the spool shaft through the above-described oscillating mechanism and the spool 5 is moved back and forth. In this manner, a fishing line is evenly wound around the spool 5 through the fishing line guide 15.

Referring to FIGS. 2 and 3, the fishing line guide 15 may include a line slider 21 that may be fastened on one of the support members 11 with a screw 19. The line slider 21 may have a support portion (supporting shaft) 17 that extends in the axial direction such that the screw 19 is installed therein. The support portion 17 may be formed integrally with the line slider 21 as illustrated in FIGS. 2 and 3, or may be formed integrally with the support member 11.

A proximal end of the bail 13 may be connected with the line slier 21. When the bail 13 is rotated to the fishing line winding state to initiate winding of a fishing line, the fishing line is guided from the bail 13 through the line 21 to a line roller 23 which is one of the components of the fishing line guide 15.

The line roller 23 may be rotatably supported by the support portion 17 through a collar 27 and a magnetic fluid sealed bearing 25 in which the magnetic fluid seal is provided integrally with the bearing, which will be hereunder described. In this embodiment, the line roller 23 may be hollow and may have a substantially cylindrical shape and its outer surface may be smoothed. According to this configuration, the fishing line guided from the bail 13 through the line slider 21 passes smoothly on the outer surface of the line roller 23 to the spool 5 where the fishing line is wounded around. The outer shape of the line roller 23 is not particularly limited.

Providing the collar 27 is advantageous in the embodiment. More specifically, when two magnetic fluid sealed bearings 25 are disposed in parallel to support line rollers 23 rotatably, a size in the axial direction is increased by the bearings that house the magnetic seal mechanism. However, the axial direction size can be made smaller by replacing one of the bearings 25 with the collar 27 to support the line roller 23, and at the same time the line roller 23 can be stably supported. In this case, the collar 27 is preferably formed of resin in order to balance the rapid rotation of the rotor by reducing the weight. However, the collar 27 may be alternatively made of metal such as aluminum.

The magnetic fluid sealed bearing 25 and the collar 27 may be disposed between an inner surface of the line roller 23 and the outer surface of the support portion 17, and they are arranged alongside in the axial direction (a direction along the rotational axis of the line roller 23) with a certain space therebetween.

Opposing ends (inner ends) of the magnetic fluid sealed bearing 25 and the collar 27 that face to each other contact with either end of a catch 29 formed as a projecting portion of the inner surface of the line roller 23. An outer end of the collar 27 faces a step catch 33 formed on the support portion 17 with a prescribed gap "c" (for example, the size of the gap is 0.1 to 0.2 mm, see, in particular, FIG. 3). An outer end of the magnetic fluid sealed bearing 25 (more specifically, an inner ring 30a of a bearing body 30 in the magnetic fluid sealed bearing 25, which will be hereunder described) contacts with a fitted catch 37 which is formed on the support member 11 and fitted to an end of the support portion 17 without pressure in the axial direction (the axial direction of the support portion 17). That is, the magnetic fluid sealed bearing 25 (or an assembly including the magnetic fluid sealed bearing 25, the collar 27, and the line roller 23) is supported on the support portion 17 without pressure in the axial direction of the support portion 17 but with a play (the gap "c") in the axial direction. In other words, displacement of the magnetic fluid sealed bearing 25 and the collar 27 in the axial direction is restricted by the catches 29, 33, 37 with a prescribed play (the gap "c") in the axial direction.

The magnetic fluid sealed bearing 25 disposed in the fishing line guide 15 will be now described. As clearly illustrated in FIGS. 2 and 3, the magnetic fluid sealed bearing 25 may include the bearing body 30 including the cylindrical inner ring 30a, an cylindrical outer ring 30b surrounding the inner ring 30a, multiple rolling members (rolling elements) 30c disposed between the inner ring 30a and the outer ring 30b.

In the embodiment, the inner ring 30a, the outer ring 30b, and the rolling members 30c may be formed of a magnetic material such as chrome-based stainless steel (SUS440C). However, the rolling members 30c may not necessarily be formed of magnetic materials.

At the sides of the inner and outer rings 30a, 30b having an opening, a magnetic fluid seal 40 that may be retained integrally with the bearing body 30 and form a magnetic circuit with the inner ring 30a or the outer ring 30b is provided to seal the inside of the bearing body 30. In this embodiment, the same magnetic fluid seal 40 is provided on the openings at either side of the inner and outer rings 30a, 30b. For the sake of convenience, only one side (the left side one in FIGS. 2 and 3) will be hereunder described.

The magnetic fluid seal 40 may include a ring-shaped magnet (hereinafter referred to as the "magnet") 42 that forms a magnetic circuit with the inner ring 30a or the outer ring 30b, a ring-shaped retaining plate (a "polar plate") 44 disposed on the axially outer side surface of the magnet 42 (retaining the magnet 42), and magnetic fluids 45 retained in the magnetic circuit formed by the magnet 42 (retained between the inner ring 30a or the outer ring 30b and the retaining plate 44 or the magnet 42). These members may constitute a function of sealing for shutting out seawater, foreign substances, etc. from the rolling members 30c. More specifically, the magnetic fluids 45 may include an outer ring magnet fluid 45b that is retained between the outer ring 30b and the retaining plate 44 or the magnet 42 (between the outer ring 30b and the magnet 42 in this embodiment), and an inner ring magnetic fluid 45a retained between the inner ring 30a and the retaining plate 44 or the magnet 42 (between the inner ring 30a and the retaining plate 44 in this embodiment).

The magnet 42 may be a permanent magnet having a high flux density and a high magnetism, such as a neodymium magnet prepared by sintering. The magnet 42 may be previously magnetized such that the magnetic poles (the S-pole, the N-pole) point to the axial directions (the axial direction of the bearing 25). On the axially outer side surface of the magnet 42 may be disposed the retaining plate 44. The retaining plate 44 may be formed of a magnetic material such as chrome-based stainless steel (SUS440C).

Although the magnet 42 and the retaining plate 44 are bonded to each other in advance, they may be not. When these two elements are previously bonded to each other, the magnet 42 can be readily positioned or centered, and the magnet 42 and the retaining plate 44 are integrated into a unit that can be readily built in.

The outer ring magnetic fluid 45a and the inner ring magnetic fluid 45b may be prepared by dispersing magnetic fine particles such as $Fe_3O_4$ into a base oil using a surfactant in a stable state so as to have viscosity and react with a magnet when it is brought close thereto. Thus, the magnetic fluids 45a, 45b may be stably retained in position by the magnetic circuits formed between the magnet 42, and the inner and outer rings 30a, 30b made of a magnetic material and the retaining plate 44.

Moreover, a step 60 may be projected from the inner surface of the outer ring 30b toward the rolling members 30c. Due to the presence of the step 30b, the outer ring 30b may include a thin region 30bA near the both openings and a thick region 30bB near the rolling members. Thus, the distance between the inner ring and the outer ring is larger in the axially outer regions than in the axially inner region. This step 60 is formed to generate a gap (step gap) to retain the magnetic fluid 45. In this embodiment, the step 60 is formed such that a surface 60a vertical to the axial direction is formed (with this vertical surface, the magnet 42 can be attached, aligned and fixed thereto). As in the embodiment, the step may include a staircase or may be sloped instead of having the vertical surface as long as the magnetic fluid 45 can be stably retained between the step and the magnet 42. When the step has a sloped surface, not only the magnetic fluid 45 can be retained but also alignment of the magnet 42 is possible.

In the embodiment, a step 85 is further provided on the end surface of the inner ring 30a. The step 85 is formed in a staircase pattern that includes a surface 86 vertical to the axial direction of the bearing 25. The retaining plate 44 is pressed and placed in a position where an inner edge 80 of the step 85 (an upper edge of the step 85 or an upper edge of the vertical surface 86) is situated within a thickness of the retaining plate 44 in the axial direction (between the point A (an outer edge in the width direction of the retaining plate 44) and the point B (an inner edge in the width direction of the retaining plate 44). By forming the step in such a staircase pattern, the magnetic fluid 45a does not swell over an end surface 44a of the retaining plate 44 and is retained in the recessed position between the retaining plate 44 and the vertical surface 86. If the inner edge 80 is situated more inner side of the bearing from the point B, the magnetic fluid 45a cannot be securely retained between the retaining plate 44 and the inner ring 30a. Moreover if the inner edge 80 is situated more outer side of the bearing from the point A, the magnetic fluid 45a swells and can easily contact with fingers when the figures hold the outer ring 30b and the inner ring 30a.

It is preferable that the vertical surface 86 of the above-described step 85 have a radial thickness D that is larger than a gap G between the inner end surface of the retaining plate 44 and the inner edge 80. In other words, the radial thickness D is not particularly limited but when a certain distance is secured (the thickness D is set larger than the gap G), swelling of the magnetic fluid 45a can be reduced and it is possible to effectively prevent the magnetic fluid from contacting a finger when the finger touches the end portion of the inner ring 30a.

The retaining plate 44 may have an outer diameter slightly larger than the inner diameter of the outer ring 30b (the inner surface of the thin region 30bA) and may be configured to be press-fitted into the opening of the outer ring 30b along with the magnet 42 bonded thereto. The retaining plate 44 may be formed to have a size so as to create a clearance with the outer surface of the inner ring 30a when press-fitted into the outer ring 30b along with the magnet 42 bonded to the polar plate 24. The length of the magnet 42 and the retaining plate 44 in the axial direction is set to create a clearance with the vertical surface 60a of the step 60 when they are press-fitted.

As stated above, when the retaining plate 44 with the magnet 42 magnetized such that the magnetic poles point to the axial directions is press-fitted into the outer ring 30b, magnetic flux is formed at the inner ring 30a and the outer ring 30b symmetrically with respect to the axial direction. Thus, the clearance between the retaining plate 44 and the inner ring 30a and the clearance between the magnet 42 and the outer ring 30b can retain the inner ring magnetic fluid 45a and the outer ring magnetic fluid 45b, respectively.

Figure 4:
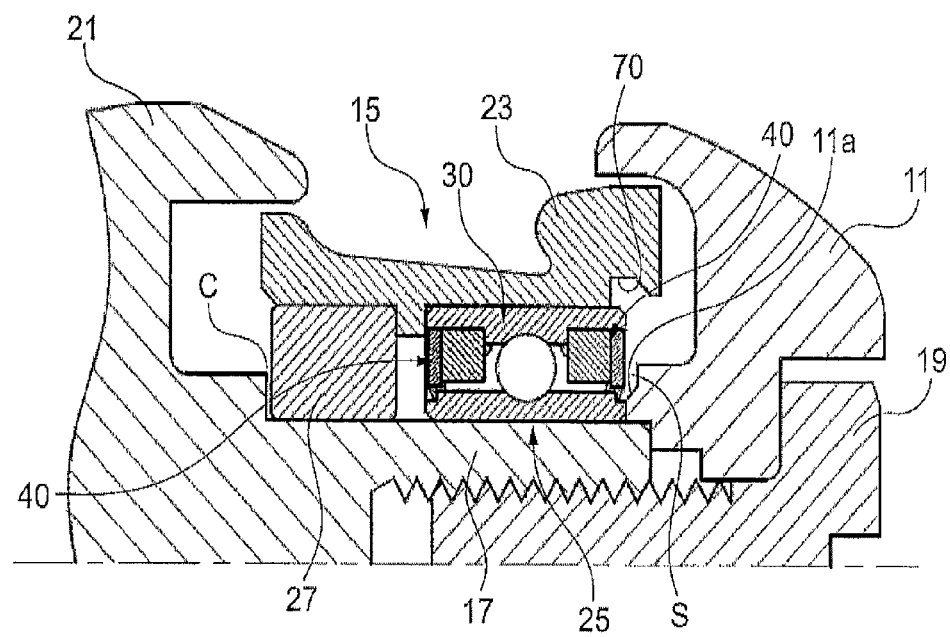
FIG. 4 is an enlarged sectional view of a modification example of the one shown in FIG. 3.

Moreover, a clearance "s" is provided between the magnetic fluid 45 (the inner ring magnetic fluid 45a in this embodiment) of the magnetic fluid seal 40 and a portion of the support member 11 facing the magnetic fluid 45a in order to prevent the magnetic fluid 45a from adhering to the support member 11. In the embodiment illustrated in FIGS. 2 and 3, the clearance "s" is formed by forming a groove in the support member 11 for allowing the magnetic fluid to flow thereto. However, the clearance "s" may be formed in any way. Moreover, in the embodiment illustrated in FIGS. 2 and 3, the groove formed in the support member 11 is a step groove that has a vertical surface. Alternatively, the groove may be a groove having an inclined surface 11a as shown in FIG. 4. When such a clearance (groove) is provided, the magnetic fluid sealing effect is sufficiently exerted even when the fishing reel is used in harsh environments.

Moreover, in the embodiment, a receiving portion 70 that receives the magnetic fluid 45 scattered by centrifugal force generated by the rotation of the rotor may be provided in a position where the magnetic fluid is expected to be scattered. For example, the receiving portion 70 may be provided at a portion of the line roller 23 within an area where magnetic force of the magnet 42 affects, in particular, at an inner surface of the end portion of the line roller 23. The receiving portion 70 may be formed as a recessed groove in the embodiment, and serve as a reservoir for the magnetic fluid.

As described above, according to the fishing spinning reel of the embodiment, the line roller 23 is rotatably supported on the support portion (supporting shaft) 17 through the magnetic fluid sealed bearing 25 in which the magnetic fluid seal is provided integrally with the bearing. Therefore, it is possible to improve the easiness of handling and maintenance. (Especially for the rapidly-rotating line roller 23 that imparts a strong tension to a fishing line to guide the fishing line to the spool 5, various foreign substances and solids of seawater and the like are adhered around the supporting portion of the line roller 23 as actual fishing is repeatedly performed. So easiness of maintenance is very beneficial.) In addition, it is possible to securely seal the bearing of the line roller 23 that rotates rapidly and imparts a strong tension to a fishing line to guide the fishing line to the spool 5. Moreover, because the magnetic fluid sealed bearing 25 is unitized, it is not necessary to secure a space for sealing in addition to a space for placing the bearing. Accordingly, only a small space is necessary to install the seal and the bearing. Further, there is no need of installing a magnetic sealing mechanism separately from the bearings, resulting in good built-in work efficiency and increased productivity (that is, reduced built-in work time and production costs).

Moreover, according to the embodiment, the magnetic fluid seal 40 is provided on the both sides of the bearing body 30. Therefore, it would be very advantageous for the line roller 23 that is used in harsh environments, rotates rapidly and guides a fishing line to which seawater, foreign substances and the like are adhered to the spool 5. In other words, by providing the magnetic fluid seal 40 on the both sides of the baring body 30, it is ensured to prevent seawater and the like from penetrating inside the bearing 25 through a fitting portion between the inner ring 30a of the bearing 25 and the support portion 17, a fitting portion between the outer ring 30b of the bearing 25 and the line roller 23, and a portion where the screw 19 is clamped. Therefore it is possible to decrease the chance that the seawater enters into the bearing 25 and degrades smoothness of the bearing. This advantageous effect can be enhanced by providing the magnetic fluid 45a, 45b to both of the inner and outer rings 30a, 30b.

When the magnetic fluid seal 40 is provided on the both sides of the bearing body 30 as described in the embodiment, both sides of the inner ring does not have to be press-fitted in the axial direction in order to enhance the waterproof property, which has been described above with reference to the '97 Publication which discloses the one-side sealed bearing structure. In the present embodiment as described above, the bearing body 30 is not pressed toward the axial direction of the supporting shaft but supported on the support portion 17 (with the prescribed play "c" in the axial direction, see FIG. 3). Therefore, a shear force in the axial direction does not work on the inner and outer rings 30a, 30b of the bearing 25. Consequently, it is possible to smooth the rotation of the bearing 25 and accordingly the rotation of the line roller 23, resulting in enhancement of the rotation performance of the line roller 23.

Moreover, in the embodiment, the clearance "s" is provided between the magnetic fluid 45 of the magnetic fluid seal 40 and the portion of the bail support member 11 facing the magnetic fluid 45 in order to prevent the magnetic fluid 45 from adhering to the support member 11. By providing the clearance "s", when the magnetic fluid 45 swells outward due to capillary action, centrifugal force generated by the rapid rotation of the rotor, pressure change caused by thermal expansion or the like, it is possible to prevent the swelling magnetic fluid 45 from being adhered to the support member 11. Accordingly, it is possible to prevent the magnetic fluid 45 in the bearing 25 from being lost and the fine sealing property can be maintained.

The present invention is not limited to the above embodiment but is capable of various modification within the purport thereof. For example, in the above-described embodiment, the outer ring magnetic fluid 45b is retained between the outer ring 30b and the magnet 42. Alternatively, the outer ring magnetic fluid 45b may be retained between the outer ring 30b and the retaining plate 44. Moreover, in the above-described embodiment, the inner ring magnetic fluid 45a is retained between the inner ring 30a and the retaining plate 44. Alternatively, the inner ring magnetic fluid 45a may be retained between the inner ring 30a and the magnet 42.

What is claimed is:
1. A fishing spinning reel, comprising:
a rotor rotated by rotational operation of a handle to wind a fishing line around a spool;
a line roller through which the fishing line is guided to the spool;
a magnetic fluid sealed bearing in which a magnetic fluid seal is provided integrally with a bearing, wherein the line roller is rotatably supported on a supporting shaft through the magnetic fluid sealed bearing, the magnetic fluid sealed bearing comprising:
- a bearing body having a magnetic inner ring, a magnetic outer ring, and a rolling member placed between the inner ring and the outer ring so as to be rollable; and
- a magnetic fluid seal retained integrally with the bearing body and forming a magnetic circuit with the inner ring or the outer ring to seal an inside of the bearing body, the magnetic fluid seal being provided on both sides of the bearing body;

wherein the magnetic fluid seal includes: a magnet forming the magnetic circuit with the magnetic inner ring or the magnetic outer ring, a retaining plate retaining the magnet, and magnetic fluid, the magnet and the retaining plate being arranged between the inner ring and the outer ring, respectively; and wherein the magnetic fluid includes an outer ring magnetic fluid and an inner ring magnetic fluid, the outer ring magnetic fluid being retained between the magnetic outer ring and either the retaining plate or the magnet, and the inner ring magnetic fluid being retained between the inner ring and either the retaining plate or the magnet.

2. The fishing spinning reel of claim 1, wherein the bearing body is supported on the supporting shaft without being pressed in an axial direction of the supporting shaft.

3. The fishing spinning reel of claim 1, further comprising:
- a support member attached on the supporting shaft to support a bail, wherein a clearance is provided between the magnetic fluid of the magnetic fluid seal and a portion of the support member facing the magnetic fluid to prevent the magnetic fluid from adhering to the support member.

* * * * *